: 2,886,581

MANUFACTURE OF TRIETHYLALUMINUM

Horace E. Redman, Baton Rouge, La., assignor to Ethyl Corporation, New York, N.Y., a corporation of Delaware No Drawing. Application March 28, 1957
Serial No. 648,994

1 Claim. (Cl. 260—448)

This invention relates to the manufacture of aluminum ethyl compounds, and more specifically to the generation of these compounds by the direct reaction of aluminum metal with hydrogen and ethylene. It is particularly valuable in connection with the manufacture of triethylaluminum, $(C_2H_5)_3Al$.

Triethylaluminum has been found to be a particularly useful organometallic material having great utility in organic synthesis generally. It is for example used as a catalytic polymerization agent for the generation of straight chain polymers of ethylenically unsaturated hydrocarbons. Triethylaluminum can be generated by the reaction of ethylene with an aluminum hydride such as monoethyl aluminum dihydride, diethyl aluminum hydride and aluminum trihydride. Unfortunately, the efficacy of this route is contingent upon a readily available and quite economical supply of aluminum hydride. As the manufacture of aluminum hydride customarily requires the use of a substantial excess of the expensive and relatively scarce material, lithium hydride, its use in the above described conventional procedure makes this prior process economically disadvantageous. Accordingly, the need exists for an economical process for the generation of triethylaluminum.

It is therefore an object of the present invention to provide an improved process for the preparation of triethylaluminum. Another object is to provide an economical and direct process for the manufacture of triethylaluminum directly from aluminum. Still another object is to provide a process involving a minimum of process steps and using moderate reaction conditions. More particularly, an object of the invention is to provide a novel catalytic process of the above type. Other objects and advantages will become apparent from the following description and examples.

It has now been found that triethylaluminum can be prepared directly from aluminum, hydrogen and ethylene. The present invention generally comprises the process of treating aluminum metal with ethylene and hydrogen in the presence of a liquid phase of triethylaluminum. The aluminum metal supplied is preferably in a comminuted form, e.g., as aluminum shavings prepared under nitrogen. In a specific embodiment of this invention, the process for preparing triethylaluminum comprises contacting the particulated aluminum with sufficient triethylaluminum to wet the metal surfaces and then heating the reaction zone to a temperature between about 30° and 130° C. under 10 to 300 atmospheres pressure of a gaseous mixture containing hydrogen and ethylene.

While the precise nature of the reaction mechanism is still uncertain, it is believed that the triethylaluminum activates the metallic aluminum by undergoing a disproportionation reaction forming an unstable intermediate which readily forms ethylaluminum hydrides. These hydrides would then add ethylene to form the triethylaluminum. Accordingly, although various contacting techniques are quite suitable for carrying out the process, it is preferred that the supply of aluminum shavings be initially wetted with a substantial quantity of triethylaluminum, and once having activated the metal and the reaction having been initiated, the operations are continued in such a manner that at least some of the additional triethylaluminum formed is retained in the liquid phase and hence continues to wet the aluminum surface. In one mode of carrying out this general type of embodiment of the present invention, the aluminum is normally provided in the form of sub-divided or comminuted solids which have been prepared under an entirely inert gas atmosphere such as, for example, argon, nitrogen, or methane. From such an atmosphere, oxygen or moisture should be preferably rigorously excluded. The aluminum solids supply is inserted within a reaction zone, taking precautions to prevent the contacting of any oxygen-containing gas or moisture therewith. A quantity of triethylaluminum sufficient to wet at least a portion of the aluminum solids is introduced into the reaction zone and the zone is then closed off except for conduits for admitting hydrogen and ethylene-containing gases. Hydrogen-containing gas is introduced into the reaction zone and the hydrogen pressure is built up to a desired operating level which is generally superatmospheric but below about 300 atmospheres. Concurrently or after attaining the desired hydrogen pressure an ethylene-containing gas is introduced into the reaction zone to a pressure which varies over a wide range but generally not greater than about 100 atmospheres partial pressure. The contents of the reactor are heated to the necessary temperature level and maintained at that level for a period which will vary according to the refinements in the apparatus available and the reaction conditions of temperature and pressure employed. During this contacting period, the contents are, preferably, continuously agitated by means of driven stirring devices or by the employment of a rocking reaction zone wherein the solids migrate sporadically from end to end of the reaction zone. In certain instances, a contacting time of the order of as high as about 20 hours will be found necessary although contacting times as low as 0.5 hour are also suitable under certain reaction conditions. This contacting time is ordinarily a function of relative magnitude of the bed of subdivided aluminum solids, the particle size of the aluminum, the pressure-temperature relationships of the reactants and the proportions of the reaction zone, e.g., the depth to superficial cross-sectional surface exposure ratio.

The details of operation and the best method of carrying out the process will be illustrated by the following examples. All parts given are intended as parts by weight.

*Example I*

About 25 parts of finely sub-divided aluminum metal is charged to an autoclave, under a dry, inert gaseous atmosphere of nitrogen. The aluminum is prepared by milling or filing in a dry nitrogen atmosphere. To this charge is added sufficient triethylaluminum, $(C_2H_5)_3Al$, to thoroughly wet all the particles of aluminum, this amount being about 20 parts. The autoclave is closed, and a pressure of about 5 atmospheres of hydrogen gas and an additional 10 atmospheres of commercially pure ethylene gas is introduced to the autoclave. The contents are slowly stirred by means of an externally driven agitator and the temperature is raised from ambient levels to about 80°–85° C. The contacting is continued for a period of from 5 to 6 hours during which time the pressure is maintained in the range indicated above. At the conclusion of this period, the temperature is then lowered to about 20°–25° C., and excess reactants are let off. The autoclave vapor space is flushed with dry gaseous nitrogen for several cycles to thoroughly remove reactant components and the triethylaluminum is recovered by distillation. A high conversion of the aluminum metal to triethylaluminum is obtained, approaching the stoichiometric yield of 100 parts.

*Example II*

The procedure of Example I is repeated, except that the reactant gas pressures are raised to a partial pressure of about 50 atmospheres of hydrogen and 100 atmospheres of ethylene respectively. The contacting time is reduced to 4 to 5 hours and a good conversion is obtained with a high yield of triethylaluminum.

*Example III*

The same procedure as obtained in Example I was employed except that a hydrogen partial pressure of 50 atmospheres and an ethylene partial pressure of 100 atmospheres is employed. The reaction temperature is increased to about 125°–130° C. and contacting time is reduced to about 2 to 3 hours. A high conversion to triethylaluminum is provided.

*Example IV*

The procedure of Example I is repeated except that a hydrogen partial pressure of 290 atmospheres and an ethylene partial pressure of 10 atmospheres is employed. At a reaction temperature of about 125–130° C. a contact time of only 0.5 hour results in a good conversion of the aluminum metal to triethylaluminum.

*Example V*

When the procedure of Example IV is repeated except that the reaction temperature employed is about 30°–40° C., high conversions to triethylaluminum are obtained with a contact time of about 20 hours.

In the foregoing examples the hydrogen-ethylene partial pressures are initially adjusted according to the desired proportions in which these components appear in the desired product. If more convenient, the gaseous reactant pressures may be sequentially adjusted and provided, thus in effect dividing the process into several stages. It will be noted that in all the examples no halogen-containing ingredients are charged into the reactor.

The gaseous pressures employed in the reactor can vary over a wide range, but generally do not exceed a total pressure within the reaction zone of about 300 atmospheres or fall below about 10 atmospheres. A preferred range is between 10 and 150 atmospheres. In general, a hydrogen partial pressure of between 3 and 290 atmospheres is suitable for all embodiments of the present invention. Normally, it is desired to employ enough ethylene pressure to have sufficient ethylene for the reaction, i.e., 2 moles of ethylene per mole of hydrogen reacted. Although the most preferred operation is obtained using super-atmospheric ethylene pressure the range of ethylene pressures employed can vary from as high as 100 atmospheres down to about 1 atmosphere. A preferred range, however, is between about 5 and 50 atmospheres. Although higher ethylene pressures than 100 atmospheres can be employed when desired, their use is generally unnecessary and ofttimes undesirable due to the losses in reactant materials occurred by numerous side reactions, i.e. ethylene polymerization and hydrogenation. When desired, various inert gases can be employed in addition to the ethylene and hydrogen in order to pressurize the reaction zone to a desired value while employing minimal quantities of the reactant gases.

As already discussed, the temperature of the present process can vary over a considerable range but in all embodiments of the invention it is desirable to maintain a correlated pressure-temperature relationship. Generally, higher operational pressures require lower reaction temperatures for a defined contact time in order to provide a comparable conversion to the desired product as is obtained at lower pressures. For the effective operation of the present process, temperatures between about 30° and 130° C. are generally applicable while particularly desirable results are obtained when operating at temperatures between about 60° and 90° C. While higher temperatures than 130° C. can be employed, their use is generally inadvisable because of the undesired side reactions, e.g., olefin polymerization, which normally occur at these temperatures in the presence of triethylaluminum and which result in losses of both ethylene and catalyst.

As heretofore mentioned, the contact time can also vary over a considerable range. By contact time is meant primarily the residence time of the reactants, i.e. aluminum, hydrogen, ethylene, triethylaluminum, in the reaction zone at reaction conditions. In all the various embodiments of the present invention, the guiding principle is that the time-temperature-pressure relationships are so adjusted as to provide the maximum conversion of the reactants to the desired triethylaluminum compounds and the minimum formation of undesired by-products. As noted above, the temperature and pressure of the operation are related to the contact time employed. Thus, decreasing the operational temperature and/or pressure generally results in a longer contact time requirement. Similarly, increasing either or both the operational temperature and/or pressure employed generally permits a substantial decrease in the contact time due to the resultant increase in reaction rates. In general, for the preferred embodiments of this invention, contact times can vary from 0.5 to about 20 hours and more preferable between about 3 and 6 hours.

The process can be carried out in either a batch or continuous operation. In most cases, continuous processing is desired for obvious economic reasons. In any event, the correlation of time-temperature-pressure noted above is generally maintained in either operation.

From the foregoing description it will be readily seen that the new reaction of the invention can be readily carried out by a number of varied and highly effective techniques and that the invention is susceptible of many different explicit forms limited only by the appended claim.

This application is a continuation-in-part of application Serial No. 520,899, filed July 8, 1955, now Patent No. 2,787,626, issued April 2, 1957.

I claim:

A process for the manufacture of triethylaluminum comprising forming an essentially halogen-free charge comprising comminuted solid aluminum and liquid triethylaluminum, the aluminum being in substantial excess to the triethylaluminum, then contacting said charge with ethylene and hydrogen at superatmospheric partial pressures and a total pressure of from about 10 to 150 atmospheres and maintaining said system at a temperature of 60 to about 130° C. for a reaction period of 0.5 to 20 hours, and feeding additional hydrogen and ethylene during said period to maintain superatmospheric partial pressures and a total pressure within said range.

References Cited in the file of this patent

FOREIGN PATENTS 535,235     Belgium _____ Feb. 15, 1955